United States Patent
Lu et al.

(10) Patent No.: US 6,597,912 B1
(45) Date of Patent: *Jul. 22, 2003

(54) CELLULAR BASE STATION WITH INTELLIGENT CALL ROUTING

(75) Inventors: Priscilla Marilyn Lu, San Carlos, CA (US); Timothy Richard White, Palo Alto, CA (US); Gerald F. Sage, Mountain View, CA (US)

(73) Assignee: International Communications International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 09/644,112

(22) Filed: Aug. 21, 2000

Related U.S. Application Data

(63) Continuation of application No. 09/049,606, filed on Mar. 27, 1998, now Pat. No. 6,173,177, which is a continuation of application No. 08/748,015, filed on Nov. 12, 1998, now Pat. No. 6,070,071, which is a continuation of application No. 08/434,598, filed on May 4, 1995, now Pat. No. 5,734,979.

(51) Int. Cl.[7] .................................................. H04Q 7/20
(52) U.S. Cl. ........................ 455/445; 445/561; 445/560; 445/73
(58) Field of Search ................................ 455/426, 434, 455/435, 445, 561, 411, 560, 432, 428, 550, 524, 525, 422, 73

(56) References Cited

U.S. PATENT DOCUMENTS

| | | | |
|---|---|---|---|
| 4,144,409 A | 3/1979 | Utano et al. | 179/2 |
| 4,144,496 A | 3/1979 | Cunningham et al. | 325/53 |
| 4,163,121 A | 7/1979 | Yoshikawa et al. | 179/2 |
| 4,672,658 A | 6/1987 | Kavehrad et al. | 379/63 |
| 4,726,014 A | 2/1988 | Goldman et al. | 370/58 |
| 4,771,448 A | 9/1988 | Koohgoli et al. | 379/60 |
| 4,777,633 A | * 10/1988 | Fletcher et al. | 370/286 |
| 4,785,450 A | 11/1988 | Bolgiano et al. | 370/95 |
| 4,825,448 A | 4/1989 | Critchlow et al. | 375/8 |
| 4,829,554 A | 5/1989 | Barnes et al. | 379/58 |
| 4,924,480 A | 5/1990 | Gay et al. | 375/8 |
| 4,955,050 A | 9/1990 | Yamanchi | 379/59 |
| 5,036,531 A | 7/1991 | Spear | 379/58 |

(List continued on next page.)

FOREIGN PATENT DOCUMENTS

| | | |
|---|---|---|
| EP | 91305096.9 | 6/1991 |
| EP | 0526285 A2 | 7/1992 |
| EP | 0534716 A2 | 9/1992 |
| EP | 0587211 A2 | 8/1993 |
| EP | 0595392 A1 | 10/1993 |
| EP | 0600681 A1 | 11/1993 |
| WO | WO91/00660 | 1/1991 |
| WO | PCT/FI94/00207 | 5/1994 |

*Primary Examiner*—Nay Maung
*Assistant Examiner*—Sonny Trinh
(74) *Attorney, Agent, or Firm*—Dorsey & Whitney LLP

(57) ABSTRACT

A base station communicates with a plurality of mobile stations over a cellular network. In one embodiment, the base station includes a transceiver configured to receive inbound information from the mobile station and transmit outbound information to the mobile station. The transceiver equalizes and decodes the inbound information and encodes the outbound information. The transceiver is coupled to a data bus for communicating the inbound and outbound information with the other elements in the base station. The transceiver is also coupled to a control bus. An trunk module is coupled to the data bus and to a mobile services center. The trunk module communicates inbound and outbound information with the mobile services center. The trunk module is also coupled to the control bus. Finally, a central processor is coupled to the control bus to control the transceiver and the trunk module. A preferred protocol is Global Systems for Mobile Communication (GSM).

5 Claims, 18 Drawing Sheets

U.S. PATENT DOCUMENTS

| | | |
|---|---|---|
| 5,084,869 A | 1/1992 | Russell .................... 370/85.7 |
| 5,210,787 A | 5/1993 | Hayes et al. ................. 379/60 |
| 5,251,248 A | 10/1993 | Tokunaga et al. ............ 379/58 |
| 5,260,987 A | 11/1993 | Mauger ...................... 379/58 |
| 5,287,384 A | 2/1994 | Avery et al. ................. 375/1 |
| 5,303,234 A | 4/1994 | Kou ......................... 370/85.2 |
| 5,305,308 A | 4/1994 | English et al. ............ 370/32.1 |
| 5,353,331 A | 10/1994 | Emery et al. ................ 379/58 |
| 5,353,333 A | 10/1994 | Puentes ...................... 379/59 |
| 5,396,543 A | 3/1995 | Beeson, Jr. et al. .......... 379/59 |
| 5,400,327 A | 3/1995 | Dezonno ..................... 370/62 |
| 5,400,390 A | 3/1995 | Salin ......................... 379/59 |
| 5,422,935 A | 6/1995 | Spear ......................... 379/63 |
| 5,479,483 A | 12/1995 | Furuya et al. ................ 379/60 |
| 5,513,183 A | 4/1996 | Kay et al. ................... 370/95.3 |
| 5,526,397 A * | 6/1996 | Lohman ..................... 455/560 |
| 5,577,105 A * | 11/1996 | Baum et al. ............. 379/93.05 |
| 5,787,364 A * | 7/1998 | Exner et al. ........... 379/100.06 |
| 5,812,951 A * | 9/1998 | Ganesan et al. ............ 455/445 |
| 5,953,668 A * | 9/1999 | Reilly ........................ 370/331 |
| 6,101,400 A * | 8/2000 | Ogaz et al. ................. 455/422 |
| 6,173,177 B1 * | 1/2001 | Lu et al. .................... 455/428 |

* cited by examiner

| 1 TRX BTS | BTS | BSC | BTS/BSC | MSC | BSC/MSC | BTS/BSC/MSC |
|---|---|---|---|---|---|---|
| 1 TRX | 3 TRX | 0 TRX | 2 TRX | 0 TRX | 0 TRX | 2 TRX |
| 1 TM | 1 TM | 6 TM | 2 TM | 6 TM | 6 TM | 2 TM |
| 0 CCPU | 1 CCPU | 3 CCPU | 2 CCPU | 3 CCPU | 3 CCPU | 2 CCPU |
| 1 Clk | 1 Clk | 1 Clk | 1 Clk | 1 Clk | 1 Clk | 1 Clk |
| 0 RF Dist | 1 RF Dist | | 1 RF Dist | | | 1 RF Dist |

FIG. 13

CELLULAR BASE STATION WITH INTELLIGENT CALL ROUTING

RELATED APPLICATIONS

This application is a continuation of application Ser. No. 09/049,606, filed Mar. 27, 1998, now U.S. Pat. No. 6,173,177, which is a continuation of application Ser. No. 08/748,015, filed on Nov. 12, 1996, now U.S. Pat. No. 6,070,071, and a continuation of Ser. No. 08/434,598, filed May 4, 1995, now U.S. Pat. No. 5,734,979 issued Mar. 31, 1998; which incorporates the following patent applications by reference:

CELLULAR PRIVATE BRANCH EXCHANGES, U.S. Ser. No. 08/435,709, filed on May 4, 1995;

METHODS AND APPARATUSSES FOR AN INTELLIGENT SWITCH, U.S. Ser. No. 08/435,838, filed on May 4, 1995;

SPREAD SPECTRUM COMMUNICATION NETWORK WITH ADAPTIVE FREQUENCY AGILITY, U.S. Ser. No. 08/434,597, filed on May 4, 1995; and SPREAD SPECTRUM COMMUNICATION NETWORK SIGNAL PROCESSOR, U.S. Ser. No. 08/434,554, filed on May 4, 1995.

FIELD

The present invention relates to a cellular base station with intelligent call routing. In particular, the present invention is used in a cellular network to communicate with mobile stations and control the information routing to reduce network congestion and improve network performance.

BACKGROUND

Cellular communication networks typically employ base transceiver stations that communicate with mobile stations. When a mobile station (MS) initiates a call to the base transceiver station (BTS), it does so with an identification code. The BTS sends the identification code to a base station controller (BSC) and mobile switching center (MSC) for authentication. The MSC determines if the identification code matches one in a valid subscriber registry. Once authenticated, the BTS is authorized to communicate with the MS and the network places the call.

Ordinarily, this procedure is efficient. For example, when a MS wishes to communicate with a person at home, via land line, the mobile transmission is routed through the base station, BSC, MSC, public switch telephone network (PSTN), and then via land line to the person at home.

However, when one MS wishes to communicate with another MS, the communication is still required to route through the MSC. This type of routing is not efficient because it reserves a portion of valuable BSC, MSC, and sometimes PSTN resources for the call. Moreover, when the base station employs a transcoder rate adapter (TRAU), a private branch exchange (PBX), or other subsystems, a portion of those resources are also reserved for the call.

Hence, one limitation of existing cellular communication networks is that the BTS and BSC must always communicate with the MSC in order to place a call from one MS to another. Moreover, this routing may require a rate adaptation even when the two MS are operating at the same rate.

Another limitation of existing cellular communication networks is that they employ dedicated hardware that lacks flexibility. For example, the BTS and BSC may be required to route calls to the MSC whether this routing is most efficient or not. As another example, these networks may impose rate adaptation on all communications to match a standard rate (e.g., 64 Kbps), whether adaptation is necessary or not.

Still another limitation of existing cellular communication networks is that they lack flexibility to incorporate advanced features such as call routing in the BTS and BSC. These networks lack the ability to be scaled and modularized, and lack the flexibility to perform multiple tasks. Moreover, since existing communication networks use a great deal of dedicated hardware, a fault can cause data loss, or even cause the network to malfunction. When a BTS or BSC is broken, the network must operate in a reduced capacity, if it can operate at all.

SUMMARY

The present invention relates to a cellular base station with intelligent call routing. In particular, the present invention is used in a cellular network to communicate with mobile stations and control the information routing to reduce network congestion and improve network performance. Exemplary embodiments are provided for use with the Global Systems for Mobile Communication (GSM) protocol.

A base station communicates with a plurality of mobile stations over a cellular network. In one embodiment, the base station includes a transceiver configured to receive inbound information from the mobile station and transmit outbound information to the mobile station. The transceiver equalizes and decodes the inbound information and encodes the outbound information. The transceiver is coupled to a data bus for communicating the inbound and outbound information with the other elements in the base station. The transceiver is also coupled to a control bus. A trunk module is coupled to the data bus and to a mobile switching center. The trunk module communicates inbound and outbound information with the transceiver and the mobile switching center. The trunk module is also coupled to the control bus. Finally, a cellular central processor is coupled to the control bus to control the transceiver and the trunk module.

In another embodiment, the base station may include a plurality of transceivers, cellular central processors, and trunk modules. The base station architecture is modular and scalable. As a result, the base station can be modified to perform a variety of tasks and scaled to accommodate various performance requirements. For example, a low performance base station may have only one transceiver, one cellular central processor, and one trunk module. A high performance base station may have several transceivers, cellular central processors, and trunk modules.

Advantages of the present invention include modularity, scalability, distributed processing, improved performance, reduced network congestion, fault tolerance, and more efficient and cost-effective base stations.

BRIEF DESCRIPTION OF THE DRAWINGS

Additional advantages of the invention will become apparent upon reading the following detailed description and upon reference to the drawings, in which:

FIG. 13 is a table depicting various embodiments of a base station according to the invention;

DETAILED DESCRIPTION

The present invention relates to a cellular base station having an intelligent routing control switch. In particular, the present invention is used in a cellular network to communicate with mobile stations and control the information routing to reduce network congestion and improve network performance. Exemplary embodiments are provided for use with the Global Systems for Mobile Communication (GSM) protocol.

The exemplary embodiments are described herein with reference to specific configurations and protocols. Those skilled in the art will appreciate that various changes and modifications can be made to the exemplary embodiments while remaining within the scope of the present invention.

For purposes of this description, the term base station (BS) includes the structure and features present in any of the BTS, BSC, or MSC. The exemplary embodiments are capable of performing any of these functions depending on their individual configuration, as explained below. Further, the term information includes both RF signals and digital words that can represent voice, data, or both.

Figure 1:
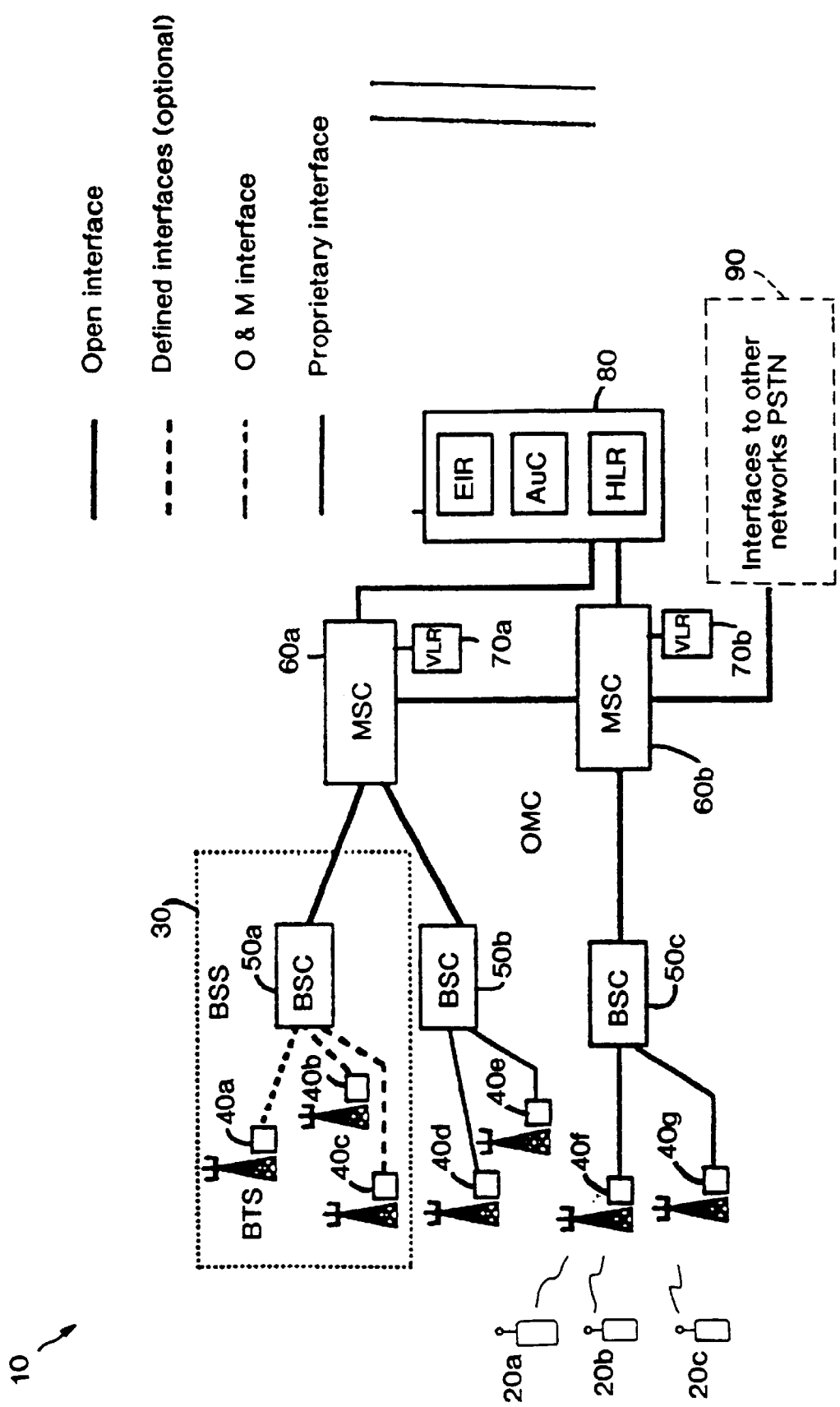
FIG. 1 depicts a cellular network.

A first embodiment is described with reference to FIGS. 1 through 3. FIG. 1 depicts a cellular network showing mobile stations (MS) 20 communicating with base transceiver stations (BTS) 40. When a MS initiates a call to BTS 40, it does so with an international mobile subscriber identification code (IMSI). BTS 40 sends the IMSI to a base station controller (BSC) 50 and mobile services center (MSC) 60 for authentication. MSC 60 determines if the IMSI matches one in a visitor location registry (VLR) 70. If the IMSI is not found in VLR 70, MSC 60 looks into a home location registry (HLR) 80 to try to match the IMSI. If the IMSI is not found in HLR 80, MSC 60 looks out through the public switched telephone network (PSTN) 90 to try to match the IMSI in other network HLRs. Once authenticated, BTS 40 is authorized to communicate with MS 20 and the network places the call.

FIGS. 2A–D show the procedures for BS 30 to communicate with MS 20. These flowcharts are indicative of a separate BTS 40, BSC 50, MSC 60 configuration, and show what processing steps are performed in what location. The FIG. 2A flowchart shows inbound information processing beginning with step 102 where the information is received from the MS. Step 104 involves framing a GSM TDMA word. In step 106, the information is equalized to compensate for multipath effects. Step 108 decodes the information. Step 110 de-interleaves the inbound information. Steps 112 and 114 are information transport steps over a trunk module (TM) which, for convenience is hereinafter described by way of example as an exemplary E1 trunk. Step 116 is a TRAU function that is performed only when required, as explained below. Steps 118 and 120 are information transport steps over an exemplary E1 trunk. Step 122 is a switching step that routes the inbound information to a correct destination. If the destination is at the BTS, the information can be routed back to the BTS as outbound information (goto FIG. 2C step 152). However, if the inbound information is destined for PSTN 90, step 124 is performed to echo cancel the information. Then, step 126 sends the inbound information over an exemplary E1 trunk to an outbound destination.

Figure 2A:
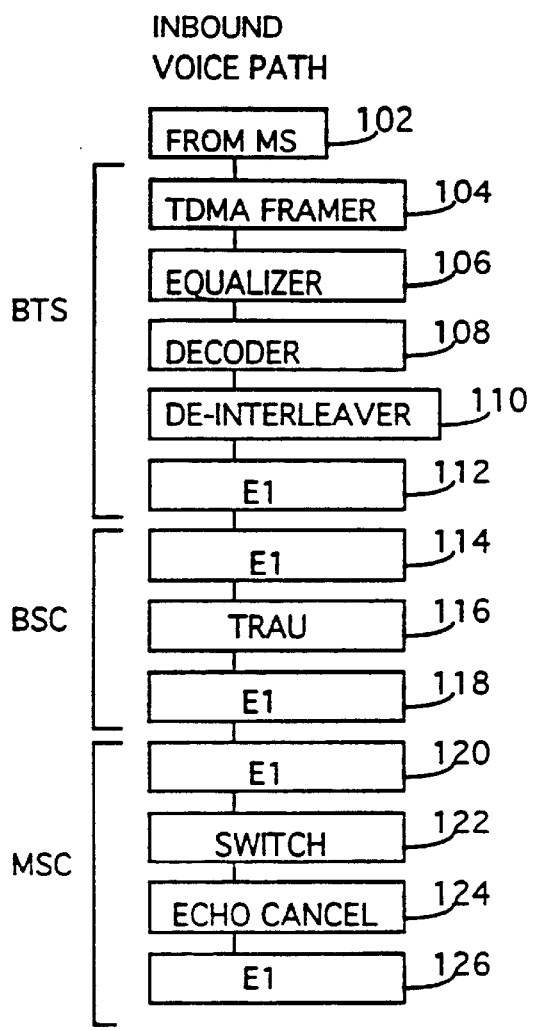
FIGS. 2A–D are flow charts showing steps performed to process inbound information and outbound information.
Figure 2B:
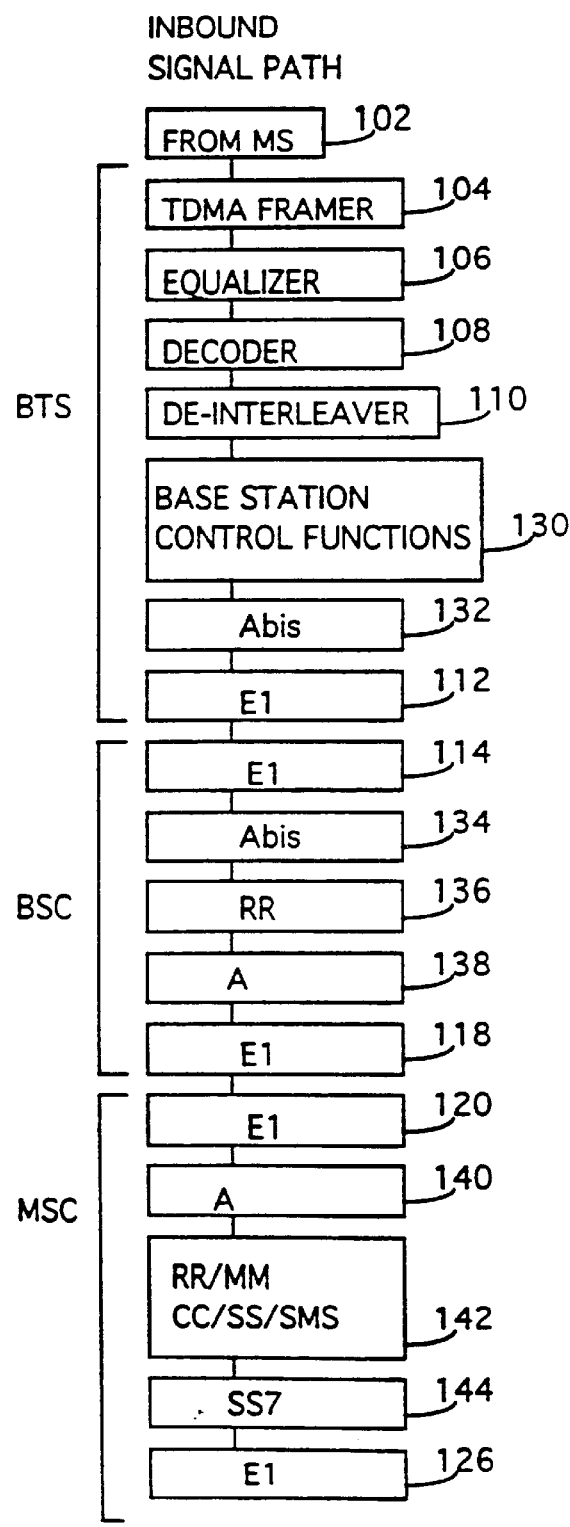

The FIG. 2B flowchart shows the inbound control signal processing. This represents the control information necessary to support voice and data communication with MS 20. Steps 102 through 110 are the same as those in the FIG. 2A flowchart. Step 130 involves base station control functions including control of the base station radio and MS power and timing. Step 132 is an Abis function which is a protocol between the BTS and BSC. Steps 112 and 114 are information transport steps over an exemplary E1 trunk. Step 134 is an Abis function which is a protcol between the BTS and BSC. Step 136 is a radio resource management (RR) procedure. Step 138 is an A function which is a protocol between the BSC and MSC. Steps 118 and 120 are information transport steps over an exemplary E1 trunk. Step 140 is an A function which is a protcol between the BSC and MSC. Step 142 can represent a variety of management procedures including radio resource management (RR), mobility management (MM), call control (CC), supplemental services (SS), and short message service (SMS). Step 144 is SS7 protocol processing, which enables cooperative interworking between other elements of the GSM network and the PSTN. Step 126 sends the inbound signal information over an exemplary E1 trunk to an outbound destination.

Figure 2C:
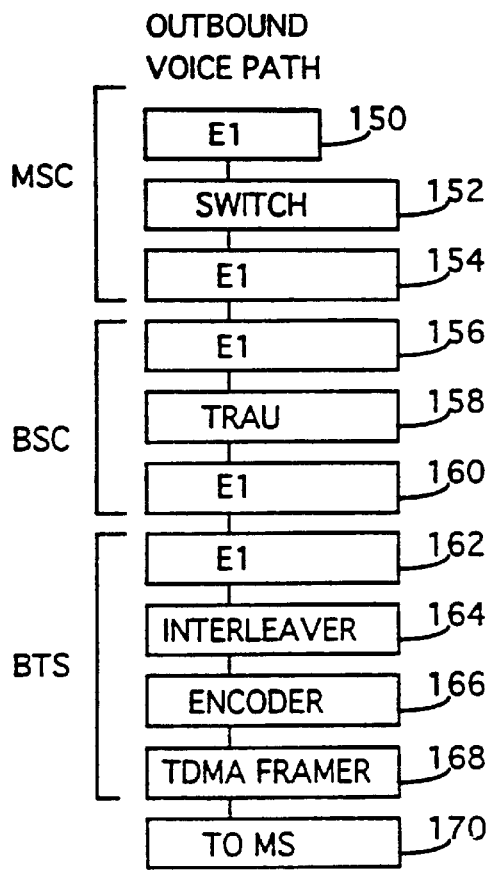

The FIG. 2C flowchart shows outbound information processing. Step 150 receives the outbound information from an exemplary E1 trunk. Step 152 is a switching step that routes the outbound information to a correct destination. Steps 154 and 156 are information transport steps over an exemplary E1 trunk. Step 158 is a TRAU step. Steps 160 and 162 are information transport steps over an exemplary E1 trunk. Step 164 interleaves the outbound information. Step 166 encodes the outbound information. Steps 168 places the outbound information into TDMA frames. Step 170 transmits the outbound information to MS 20.

Figure 2D:
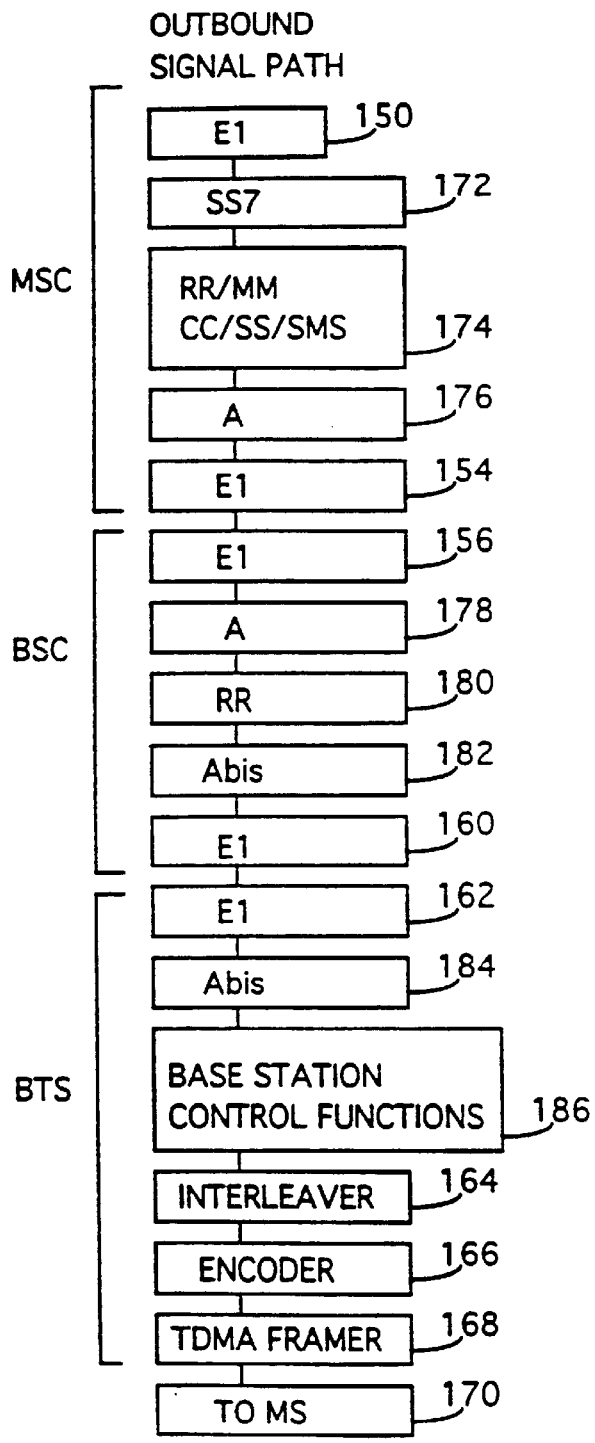

The FIG. 2D flowchart shows the outbound signal path processing. Step 150 receives the outbound information from an exemplary E1 trunk. Step 172 is a SS7 protocol processing, which enables cooperative interworking between other elements of the GSM network and the PSTN. Step 174 can represent a variety of management procedures including radio resource management, mobility management, call control, supplemental services, and short message service. Step 176 is an A function which is a protocol between the MSC and BSC. Steps 154 and 156 are information transport steps over an exemplary E1 trunk. Step 178 is an A function which is a protcol between the MSC and BSC. Step 180 is a radio resource management procedure. Step 182 is an Abis function which is a protcol between the BSC and BTS. Steps 160 and 162 are information transport steps over an exemplary E1 trunk. Step 184 is an Abis function which is a protcol between the BSC and BTS. Step 186 involves base station control functions including control of the radio and MS power and timing. Step 164 interleaves the outbound information. Step 166 encodes the outbound information. Steps 168 places the outbound information into TDMA frames. Step 170 transmits the outbound information to MS 20.

Figure 3:
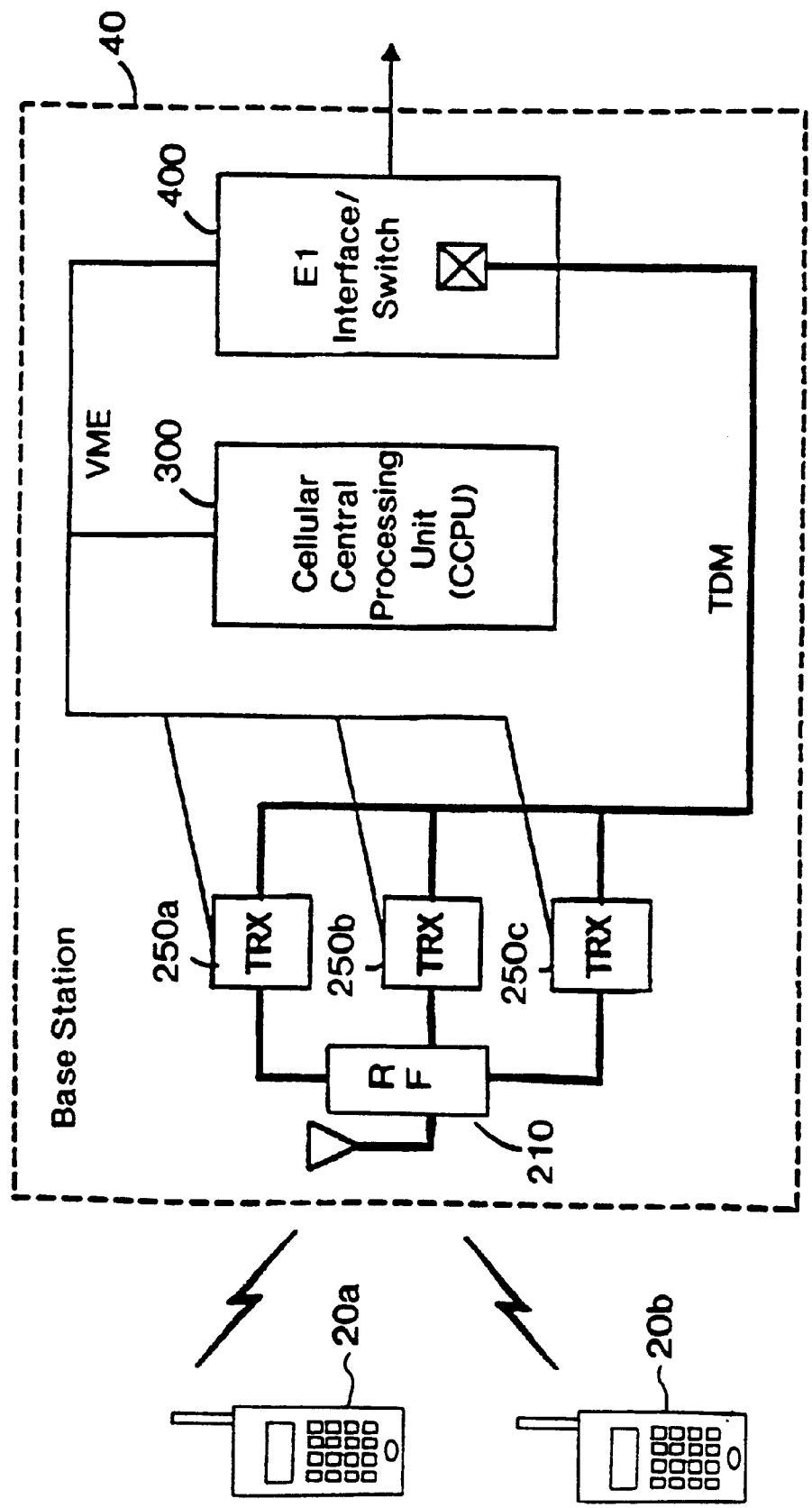
FIG. 3 depicts a base transceiver station according to one embodiment of the invention.

FIG. 3 depicts an embodiment of a base station that communicates with MSs 20a, 20b and performs the inbound information processing and outbound information processing. A radio frequency (RF) distribution module 210 amplifies and distributes inbound information to each transceiver (TRX) 250a–c. Each TRX 250 receives the inbound information and transforms the RF information into GSM TDMA format information. TRX 250 then frames, equalizes, decodes, and deinterleaves the inbound information, corresponding to steps 104, 106, 108, and 110 of FIG. 2A–B.

TRX 250 is controlled by a cellular central processor (CCPU) 300 via a control bus (VME). CCPU 300 schedules all information processing and keeps track of communication with MS 20. CCPU 300 also controls a trunk module (TM) 400 via the VME bus.

TRX 250 then sends the information to TM 400 via a data bus (TDM), which contains 16 8 Mbps subbusses. Each TRX module 250a–c can receive on any subbus and is given a predetermined subbus on which to send information to TM 400. TM 400 is a sophisticated module that includes a time/space switch, explained below. CCPU 300 controls the operation of TM 400 and determines whether TM 400 should perform any rate adaptation, echo cancelling, or interface functions, corresponding to steps 116, 122, and 124.

The outbound information processing is similarly performed as follows. TM 400 performs, if required, the interface functions and rate adaptation, corresponding to step 158. TM 400 then sends the information to TRX 250 via TDM bus for interleaving, encoding, framing and RF transmission, corresponding to steps 164, 166, 168, and 170.

Figure 4:
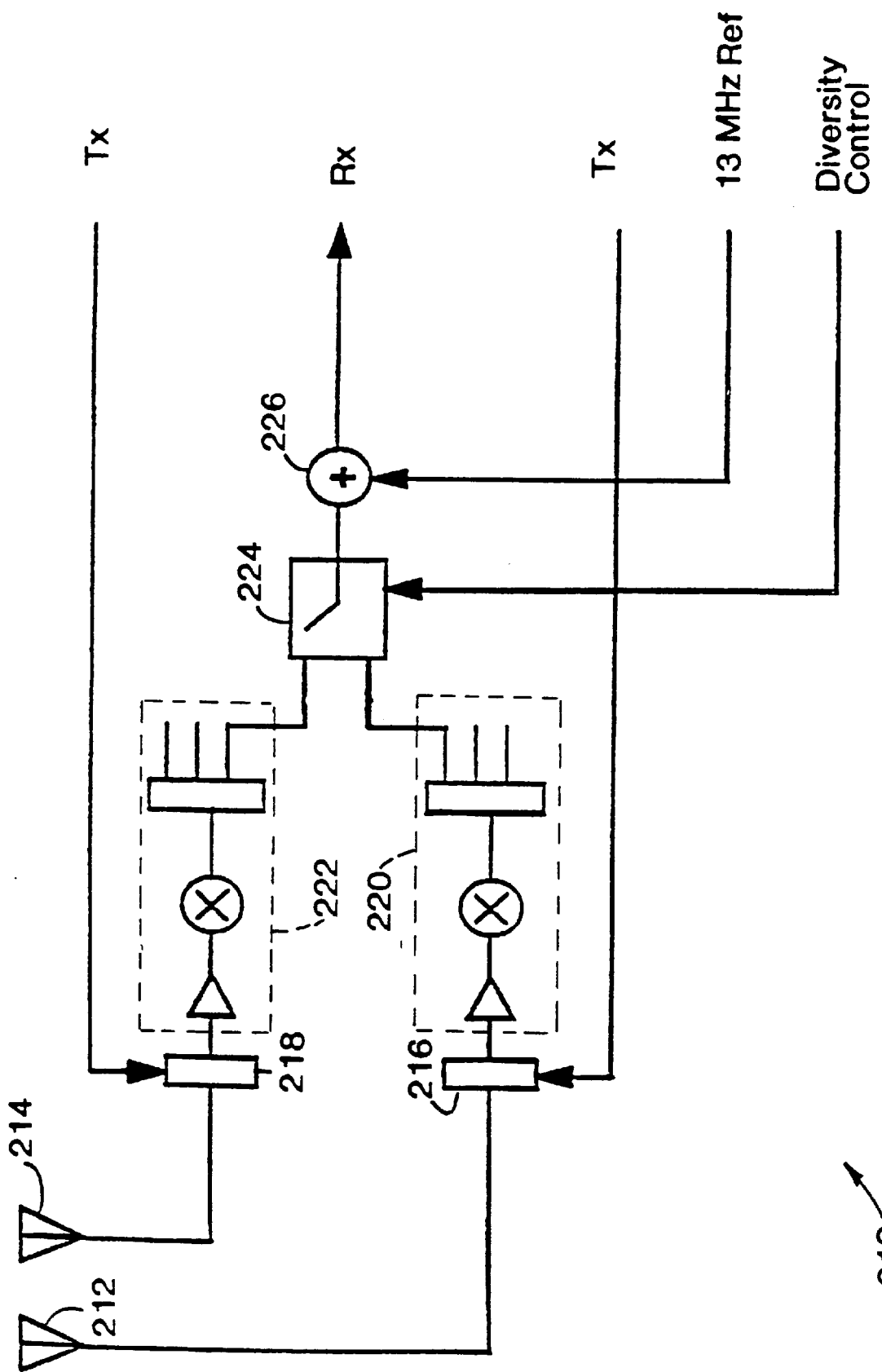
FIG. 4 depicts a radio frequency (RF) distribution module according to one embodiment of the invention.

In particular, FIG. 4 depicts RF distribution module 210. Antennae 212, 214 are coupled to diplexers 216, 218 respectively. Diplexers 216, 218 serve as filters that permit reception and transmission on the same antenna since the receive frequency is disjoint from the transmit frequency. Distribution circuits 220, 222 are used to provide fan out of received RF information. One of the circuit 220, 222 outputs are fed to a diversity switch 224. This switch 224 is controlled by downstream processing in order to select antenna 212, 214 with the best reception. In mixer 226, a 13 MHz clock frequency is superimposed on the received signal to synchronize downstream elements such as TRX 250.

Figure 5:
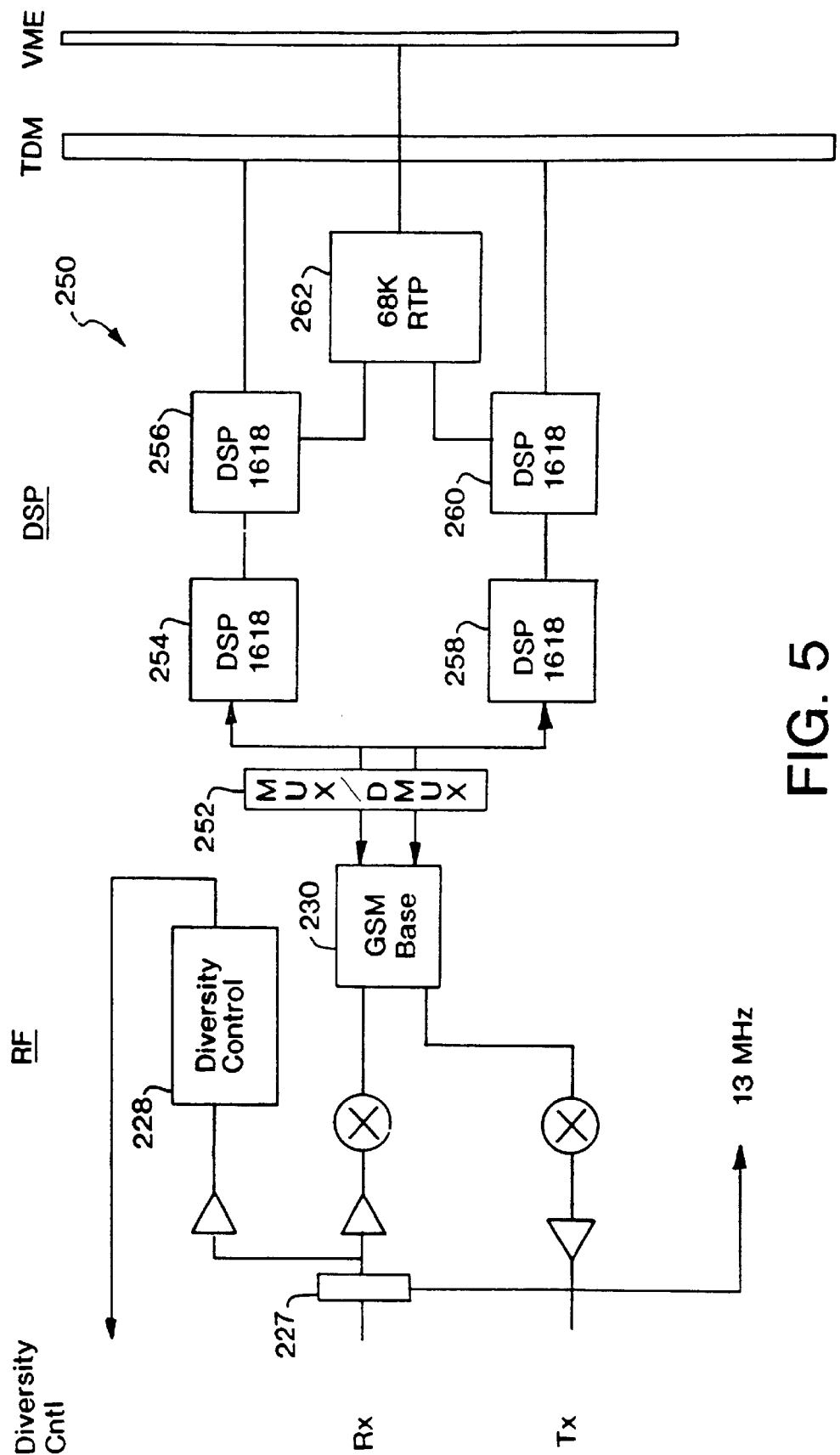
FIG. 5 depicts a transceiver (TRX) module according to one embodiment of the invention.

FIGS. 5 depicts TRX 250. Filter 227 extracts the 13 MHz clock for TRX 250 synchronization. A diversity control 228 is coupled to the RF distribution module 210 to control diversity switch 224. Diversity control 228 monitors the incoming received signal to detect signal degradation. If, for example, diversity control 228 detects sufficient signal degradation in antenna it sends a signal to switch 224 in RF distribution module 210 to select antenna 214. The RF communication and reception aspect is discussed in detail in SPREAD SPECTRUM COMMUNICATION NETWORK WITH ADAPTIVE FREQUENCY AGILITY, U.S. Ser. No. 08/434,597, filed on May 4, 1995.

Once the inbound information is received at TRX 250 and converted to a baseband frequency, a GSM baseband module 230 performs a GMSK procedure to obtain TDMA frame data. GSM baseband module 230 can perform both inbound demodulation resulting in in-phase and quadrature-phase information as well as outbound modulation resulting in a baseband frequency. A processor that works well for this purpose is the Analog Devices AD7002. Then MUX/DMUX 252 directs the inbound information to a plurality of processing paths to distribute the processing load. The signal processing aspect is discussed in detail in SPREAD SPECTRUM COMMUNICATION NETWORK SIGNAL PROCESSOR, U.S. Ser. No. 08/434,554, filed on May 4, 1995. One example of demultiplexing that works well is to send all even TDMA time slots to a first DSP string 254, 256, and to send all odd TDMA time slots to a second DSP string 258, 260. However, MUX/DMUX 252 can distribute the information to any number of DSP strings. Once DSPs 256, 260 complete the inbound information processing, they send the information to the TDM bus.

For outbound information processing, DSPs 256, 260 receive outbound information from the TDM bus. The information is divided among a plurality of processing strings. One example that works well is to send all even TDMA time slots to a first DSP string 256, 254, and to send all odd TDMA time slots to a second DSP string 260, 258. The processing is performed in parallel and the resulting outbound information is presented to MUX/DMUX 252, which multiplexes the time slots to form TDMA frames, sends them to GSM baseband module 230 and then to RF distribution module 210 for transmission.

While TRX 250 is described for TDMA, any type of modulation, multiple access, or other information coding techniques are possible. For example, GSM baseband converter 230 can be replaced or supplemented with a converter for performing CDMA, and DSP 254, 256, 258, 260 program memory can be replaced performing CDMA, and DSP 254, 256, 258, 260 program memory can be replaced or supplemented with procedures to perform CDMA. Thus, the modular architecture is capable of performing as any type of base station for a variety of different types of networks.

A Real Time Processor (RTP) 262 provisions and controls DSPs 254, 256, 258, 260 in order to schedule information processing. RTP 262 also performs power control and measurement preprocessing and link access protocols (LAPDm) for information error detection and correction. Moreover, RTP 262 keeps track of inbound information and outbound information to further enhance TRX 250 efficiency and permit the communication of inbound information and outbound information over the TDM bus.

RTP 262 communicates control information over the VME bus with CCPU 300, and receives instructions from CCPU 300 regarding operating parameters and processing requirements. Included in this control information is base station radio and MS power and timing information collected by TRX 250 as well as other packetized information from the MS. Because RTP 262 is incorporated in TRX 250, and since RTP 262 is a dedicated processor, the TRX processing performance is predicable and guaranteed.

RTP 262 is also very useful in microcell configurations where a TRX service area is small and the signal degrades rapidly. In microcell configurations, the signal strength rapidly attenuates with respect to distance. As a result, microcell configurations may require very frequent statistics gathering and error checking in order to adequately manage the MSs. A conventional radio architecture lacks the processing power to handle frequent statistics gathering with a number of MSs in a microcell configuration and may drop the MS, which may have already left the service. The invention overcomes the processing hurdle by incorporating RTP 262 in TRX 250 to provide processing that supports microcell configurations and frequent statistics gathering.

RTP 262 serves the goal to distribute processing power and delegate processing tasks to where the tasks can be most efficiently performed. In a single TRX configuration, RTP 262 can even perform all the necessary functions so that a CCPU 300 is not required. Also, as described below, when the number of TRX cards increases, the processing power scales proportionally. By performing the processing tasks in the TRX, the control traffic is minimized between the TRX and CPU, and the CPU load is not significantly increased with additional TRXs.

Figure 6:
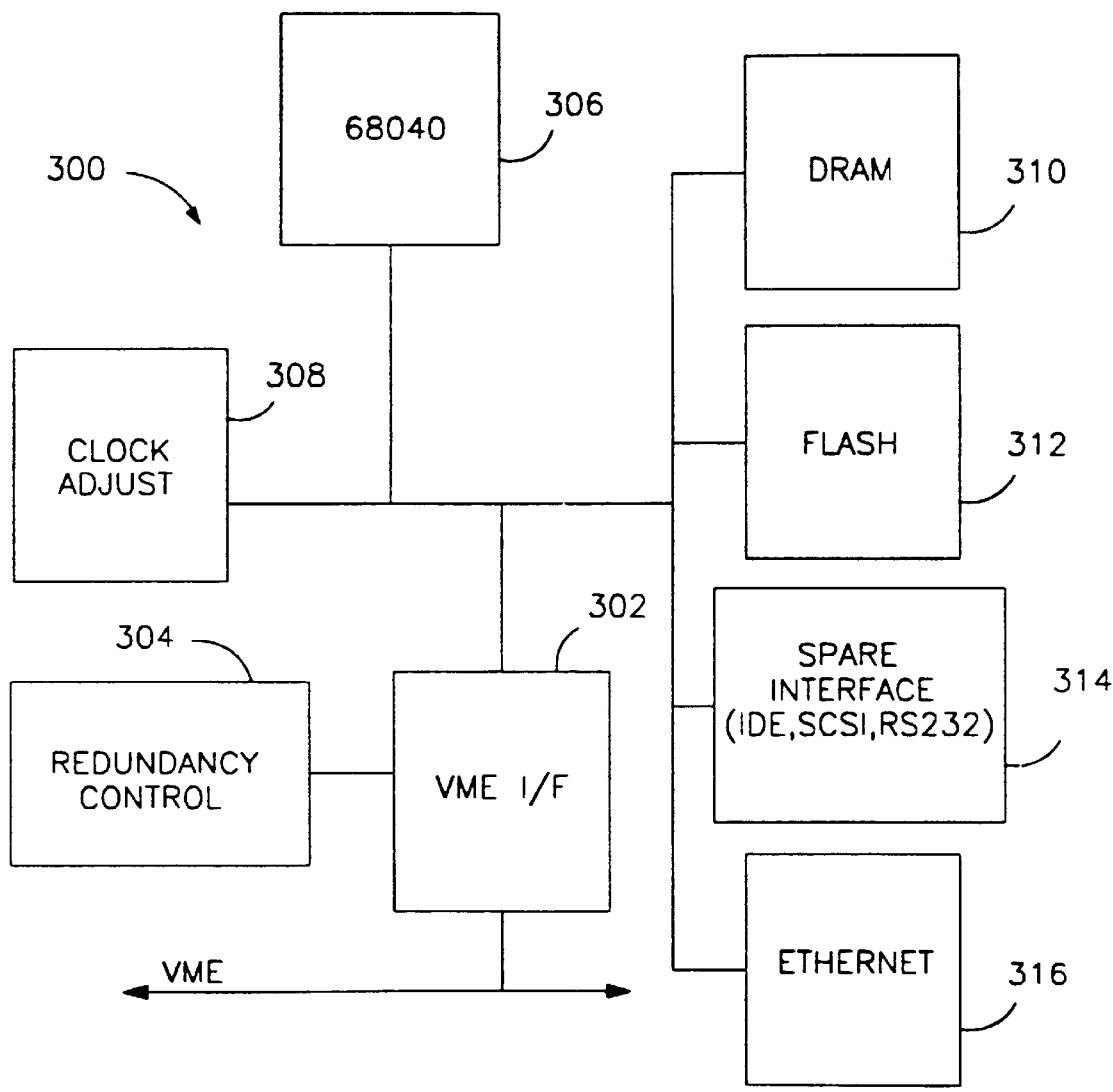
FIG. 6 depicts a cellular central processor according to one embodiment of the invention.

FIG. 6 depicts CCPU 300. A VME interface 302 is coupled to the VME bus and buffers all communication therewith. A redundancy control 304 is coupled to interface 302 to monitor interface 302 and to take over if necessary. Processor 306 is coupled to interface 302 to communicate over the VME bus. Processor 306 receives the packetized information from a MS when a call is placed. Processor 306 controls the signalling path of the call and configures TM 400 to accommodate the call switching. Additionally, processor 306 performs many of the housekeeping and scheduling functions required in the BS such as maintaining a record of active MSs, MS information rates, call connection information, and other information. Moreover, relating back to FIGS. 2B and 2D, processor 306 can provide BCF, RR, MM, SS, CC, or SMS functions if desired (steps 136, 142, 174, 180). Clock adjust 308 receives a clock signal and correlates the signal with other tracking information, such as data transfer clocks, to conform the clock to a uniform standard. CCPU 300 also has a variety of ports for modules such as DRAM 310, flash memory 312, a spare port 314 for IDE, SCSI, or RS232, and ethernet 316.

Some configurations described below have several CCPUs. Benefits of additional CCPUs include redundancy, flexibility and increased central processing power. When the base station is coupled to several other network elements, central processing power is useful to coordinate inbound and outbound information, and to control TM 400 switching as described below.

Figure 7:
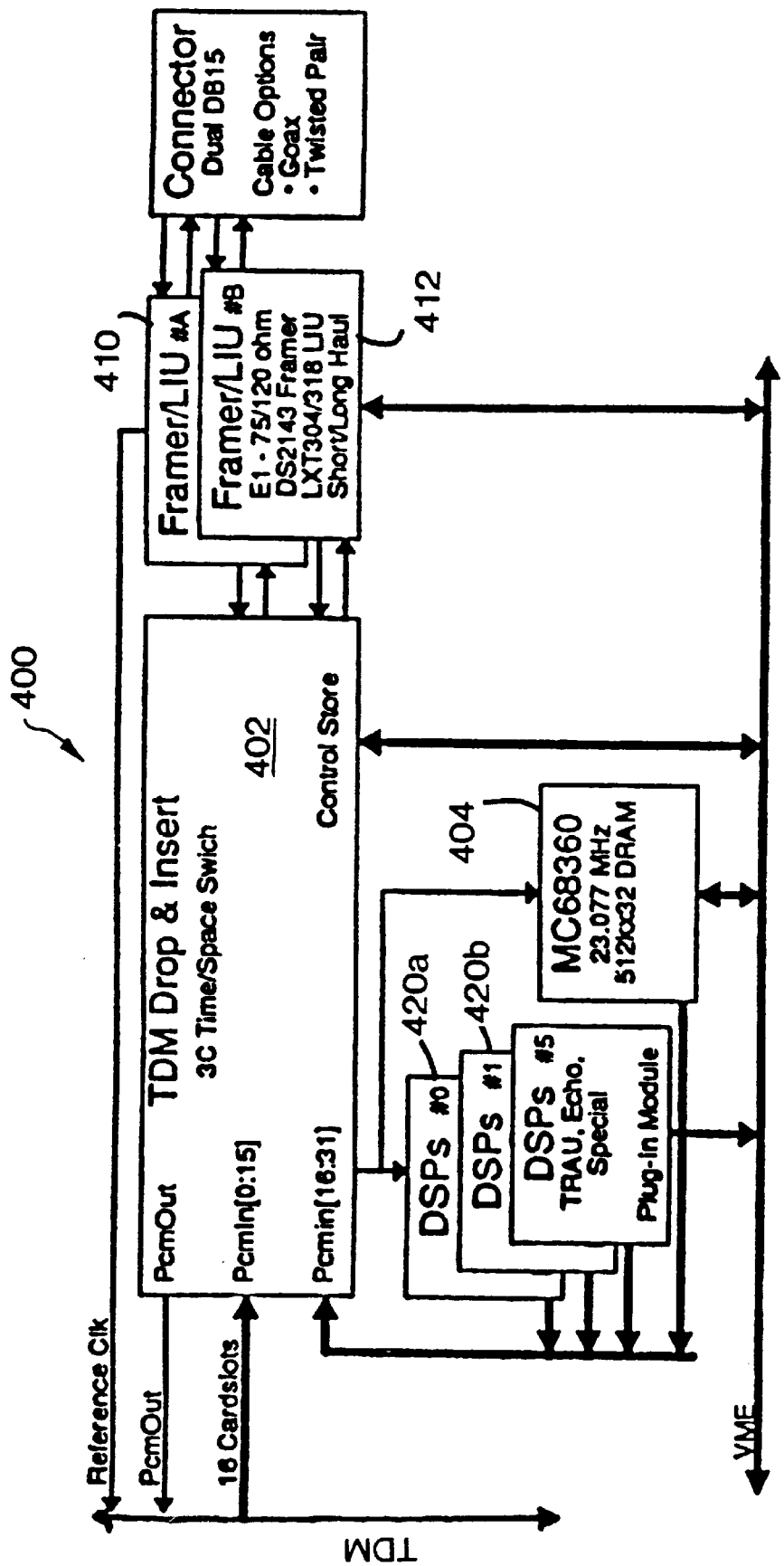
FIG. 7 depicts a trunk module according to one embodiment of the invention.
Figure 8:
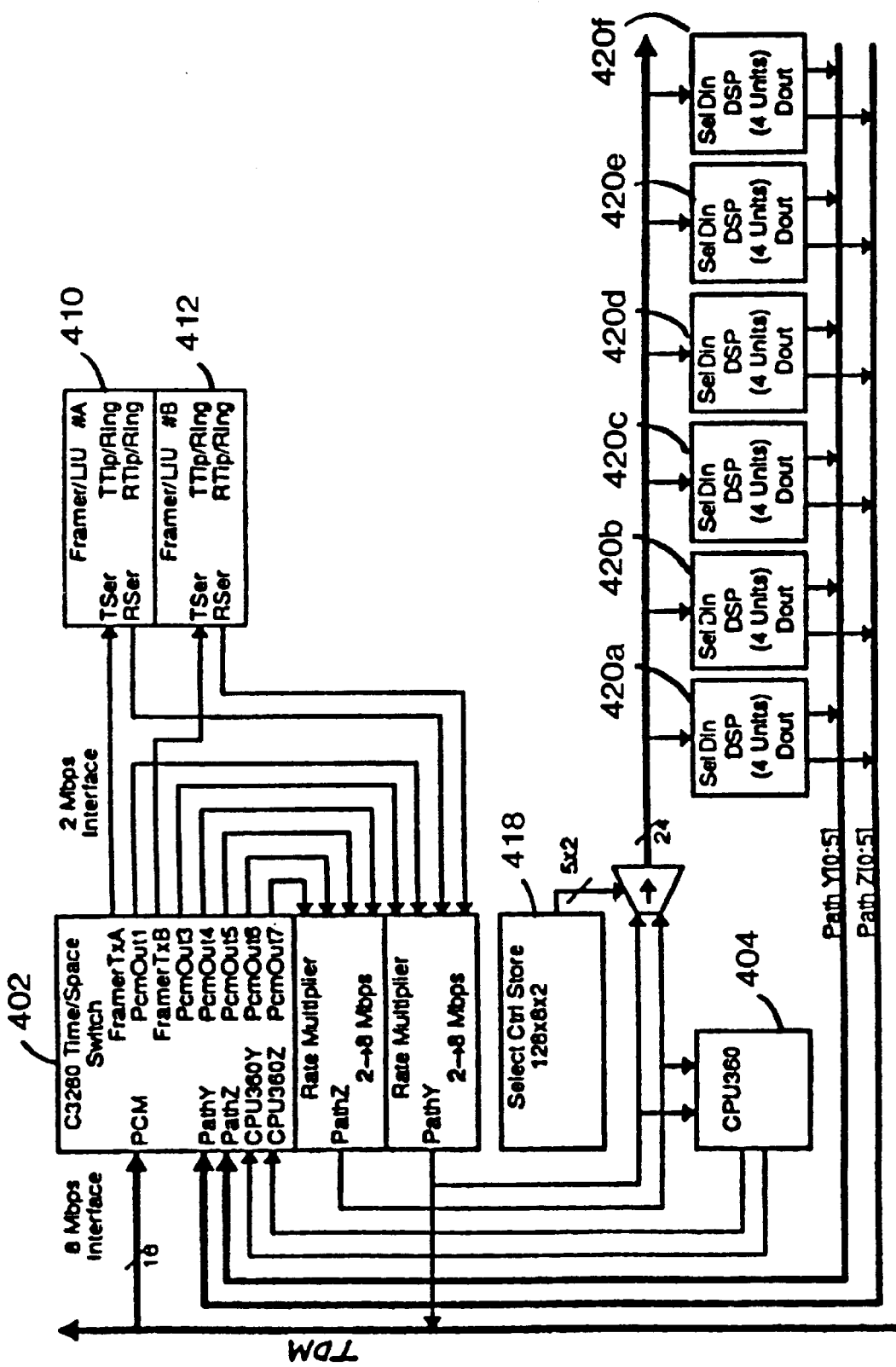
FIG. 8 depicts a detailed schematic of a trunk module according to another embodiment of the invention.

FIGS. 7 and 8 depict TM 400. At the heart of TM 400 is a time/space switch 402, which is coupled to both the TDM bus for data and the VME bus for control. Time/space switch 402 is capable of routing information between the TDM bus, processor 404, interface framers 410, and DSPs 420a–f. Time/space switch 402 is described herein according to its communication data rates and switch capabilities. Any device capable of performing these functions can be used in the present invention such as the 3C Ltd. C3280 processor or the Siemens family of digital switching ICs of which PEB 2045 memory time switch is an example.

Time/space switch 402 has many ports as shown in FIG. 8. A PCM input port is coupled to all 16 TDM subbusses, which can each transfer 8 Mbps. In essence, time/space switch 402 can communicate with up to 16 modules such as TRXs, other TMs, or any other type modules attached to the TDM bus. A larger number is possible if time/space switch 402 is configured to have even more ports and the TDM bus is configured to have even more subbusses.

Time/space switch 402 supports many of the switching functions described in CELLULAR PRIVATE BRANCH EXCHANGES, U.S. Ser. No. 08/435,709, filed on May 4, 1995, and METHODS AND APPARATUSSES FOR AN INTELLIGENT SWITCH, U.S. Ser. No. 08/435,838, filed on May 4, 1995. Moreover, when the base station is configured to perform switching functions, the base station can perform functions of a cellular PBX, a local loop, or other similar functions.

Processor 404 is coupled to time/space switch 402 via 8 Mbps CPU360Y and CPU60Z input ports, and further coupled to 8 Mbps PathY and PathZ output ports, as shown. Processor 404 is also coupled to VME bus, as shown in FIG. 7. Processor 404 is provided to perform protocol processing. Possible protocols include Abis, A, SS#7, and ISDN. This processing enables cooperative interworking between other elements of the GSM network and the PSTN. Moreover, processor 404 provides distributed processing that is dedicated to the TM 400 and becomes scaled as the number of TMs increases. Processor 404 also serves as a protocol engine for TM 400 and helps reduce latency and improve performance for handling SS#7 signalling. If protocol processing is not required, and a CCPU 300 is present in the configuration, then processor 404 may be omitted since CCPU 300 includes processor 306 for performing general functions.

Framers 410, 412 are coupled to time/space switch 402 via 2 Mbps framer ports TxA and TxB. The 2 Mbps is an E1 interface rate, but can be modified for any interface rate. Framers 410, 412 are configured to communicate with other network elements such as a BTS, BSC, MSC, PBX, PSTN, or others. Since the base station can be configured to perform the functions of a BTS, BSC, or MSC, the type of interface may be changed to accommodate the particular required interface function. For example, framers 410, 412 shown in FIG. 7 can interface with an E1 at 2 Mbps, a T1 at 1.544 Mbps, DS0 at 64 Kbps, or other digital interface.

DSPs 420a–f are coupled to time/space switch via 8 Mbps PathY and pathZ output ports. A select control store 418 controls what information is transferred to which DSP 420a–f. DSPs 420a–f can perform a variety of functions including transcode rate adaptation, echo cancelling, or other special functions such as those described below. Once DSPs 420a–f complete their respective functions, the information is then delivered back to time/space switch 402 via pathY and pathZ input ports.

As explained above with reference to FIG. 2A, the required information processing may sometimes include echo cancelling (step 124), transcode rate adaptation TRAU (step 116), or other internetwork functions (IWF). Time/space switch 402 receives control signals from CCPU 300 over the VME bus, instructing time/space switch 402 what to switch or connect.

When echo cancelling, rate adaptation, or some other function is required, time/space switch 402 routes the information to a DSP 420 to perform the processing. As shown, there are 6 DSPs 420a–f, however, there may be from zero to any number as required for the processing. Further, the DSPs 420a–f may each have 2 or 4 processor engines such as AT&T DSP1611 or TI TMS320C52 to perform the required processing function.

With regard to the TRAU function, the GSM MS communicates compressed voice at 16 Kbps, while the PSTN DS0 interface is 64 Kbps. A DSP 420 modifies the compression to accommodate this rate change. The DSP 420 can also accommodate a rate change between any rates such as 8 Kbps, 16 Kbps and 64 Kbps.

Figure 9A:
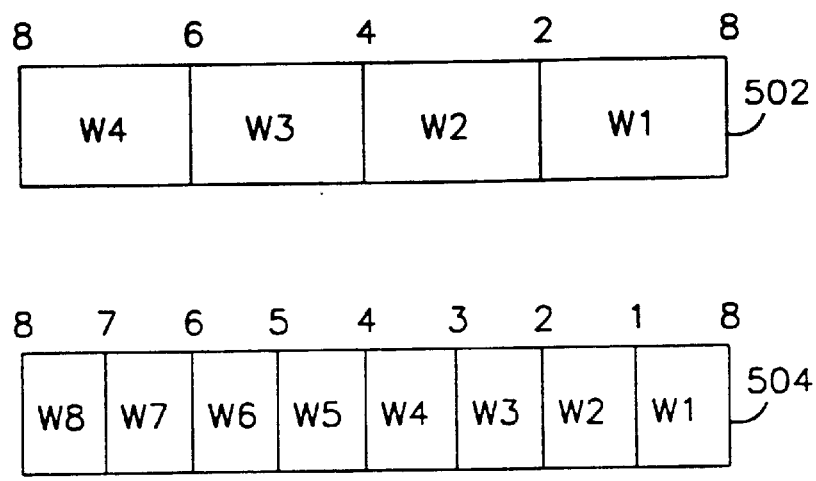
FIGS. 9A–C depict a configuration for switching information at sub-64 Kbps rate.

As mentioned above, information traffic switching at rates below 64 Kbps is a feature of the invention. Two aspects of the sub-64 Kbps information switching are described. First, a communication is described that enables sub-64 Kbps data streams to be assembled into a standard DS0 64 Kbps data stream. To accomplish this aspect, the DSPs 420a–f are employed to assemble sub-64 Kbps data streams into DS0 data streams to send to other network elements, and to disassemble DS0 data streams from other network elements. For example, FIG. 9A shows an 8-bit 64 Kbps DS0 data stream 502 containing 4 16 Kbps data streams (W1, W2, W3, W4) and an 8-bit 64 Kbps DS0 data stream 504 containing 8 8 Kbps data streams (W1, W2, W3, W4, W5, W6, W7, W8). This permits either 4 16 Kbps calls or 8 8 Kbps calls to be communicated in a single DS0 data stream, where conventionally only one call is supported. Moreover, the DS0 data stream can contain a lesser number by padding the data streams with predetermined bits.

Figure 9B:
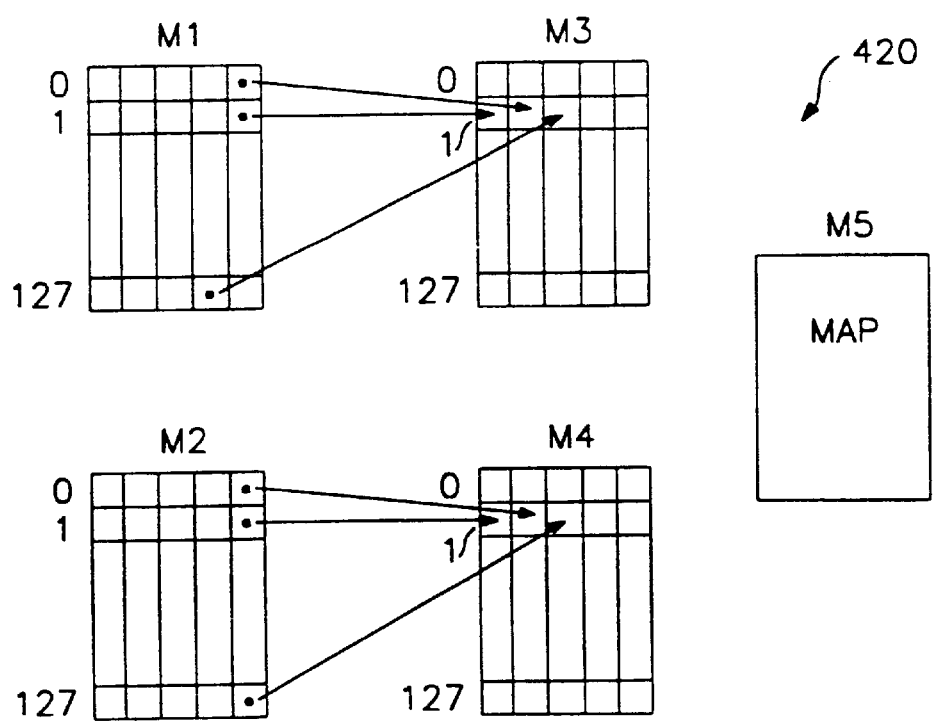

FIG. 9B depicts how DSPs 420a–f can be configured to perform the assembly and disassembly required to read and write the sub-64 Kbps data streams into 64 Kbps data streams. Each DSP 420 that is instructed to perform the communication has its memory configured with 4 buffers and a map, where the first 4 (M1, M2, M3, M4) are buffers for storing the data streams and number 5 (M5) is for storing the memory map to direct the DSP function buffer memory mapping. FIG. 9B shows how buffer M1 is mapped to buffer M3 and buffer M2 is mapped to buffer M4, although any mapping can be programmed.

Figure 9C:
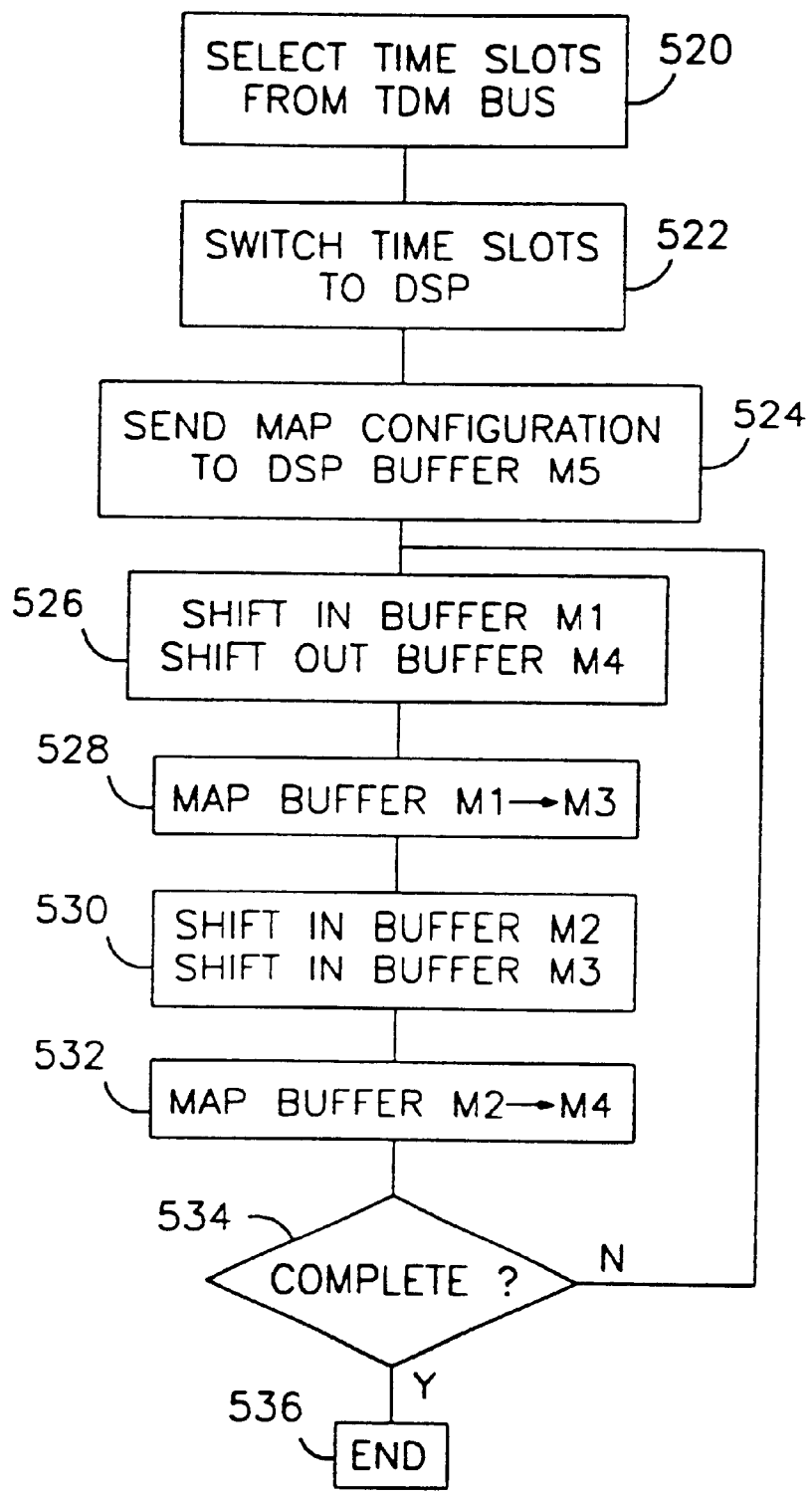

FIG. 9C is a flowchart describing the procedure for mapping TDM information into a DS0 64 Kbps data stream. Step 520 is where time/space switch 402 receives time slots information from the TDM bus. Step 522 switches desired time slots to selected DSP 420a–f via PcmOut4-7 and PathZ or PathY. In step 524, CCPU 300 sends a map via the VME bus to selected DSP 420a–f that programs the mapping function into M5. Step 526 shifts a portion of the time slot information into buffer M1 while information is being shifted out from buffer M4 via PathY or PathZ to time/space switch 402. Step 528 performs the mapping from buffer M1 to M3. Step 530 shifts a portion of the time slot information into buffer M2 while information is being shifted out from buffer M3 via PathY or PathZ to time/space switch 402. Step 532 performs the mapping from buffer M2 to M4. Step 534 determines whether the DSP 420 should continue. Under normal circumstances, DSP 420 would continuously process information and the loop would continue. However, if the DSP is instructed to end, step 534 sends the processing to step 536 where the processing ends. Thereafter, DSP 420 is free to perform other processing.

Second, to comply with GSM, speech is sampled by MS 20 at 64 Kbps and compressed to 13.2 Kbps data streams using standard vocoder algorithms. The information is then sent to BTS 40 via RF communication. Each inbound 13.2 Kbps data stream is received by TRX 250 and typically packed into a 16 Kbps data stream and routed within BTS 40. In conventional equipment, these 16 Kbps data streams are decompressed to 64 Kbps and transferred to an MSC where standard 64 Kbps switching is performed. However, the present invention is capable of intelligently routing calls at 8 Kbps, 16 Kbps, or other rates, thus avoiding unnecessary rate conversions.

This second aspect is apparent when a call is made from a first MS 20a to a second MS 20b within the base station service area. Time/space switch 402 may simply route the inbound information from the first MS 20a back out onto the TDM bus as outbound information for the second MS 20b. This type of switching is explained below with reference to FIGS. 14A–D and 15A–D. Moreover, this type of switching is further explained in CELLULAR PRIVATE BRANCH EXCHANGES, U.S. Ser. No. 08/435,709, filed on May 4, 1995, and METHODS AND APPARATUSSES FOR AN INTELLIGENT SWITCH, U.S. Ser. No. 08/435,838, filed on May 4, 1995.

The call routing function can also be performed in a variety of other ways depending on the mobile station communication with a base station. For example, if a first MS 20a and a second MS 20b are communicating with a single TRX 250a, and within a single DSP string 254, 256, the DSP string can receive the inbound data from first MS 20a, and then send it as outbound information to second MS 20b. Since the inbound and outbound information is at 13.2 Kbps, and is routed inbound and outbound within a single DSP string, it does not need to be packed into a 16 Kbps data stream. As another example, if a first MS 20a and a second MS 20b are communicating with a single TRX 250a, but with different DSP strings, TRX 250a may receive the inbound data from first MS 20a in one DSP string, and then send it as outbound information to another DSP string and then to second MS 20b. Since the inbound and outbound information are processed by different DSP strings, the information is packed into a 16 Kbps data stream for communication between the DSP strings. Moreover, in one case, the first DSP string communicates the information to the second DSP string over the TDM bus. As still another example, if a first MS 20a is communicating with a first TRX 250a and a second MS 20c is communicating with a second TRX 250b, first TRX 250a may receive the inbound information and send it via the TDM bus to second TRX which treats it as outbound information to second MS 20c. Since the inbound and outbound information are processed by different TRXs, the information is packed into a 16 Kbps data stream for communication between TRXs. Note that these examples do not send the information to TM 400. Note also that these examples do not decompress the information to 64 Kbps.

Figure 10:
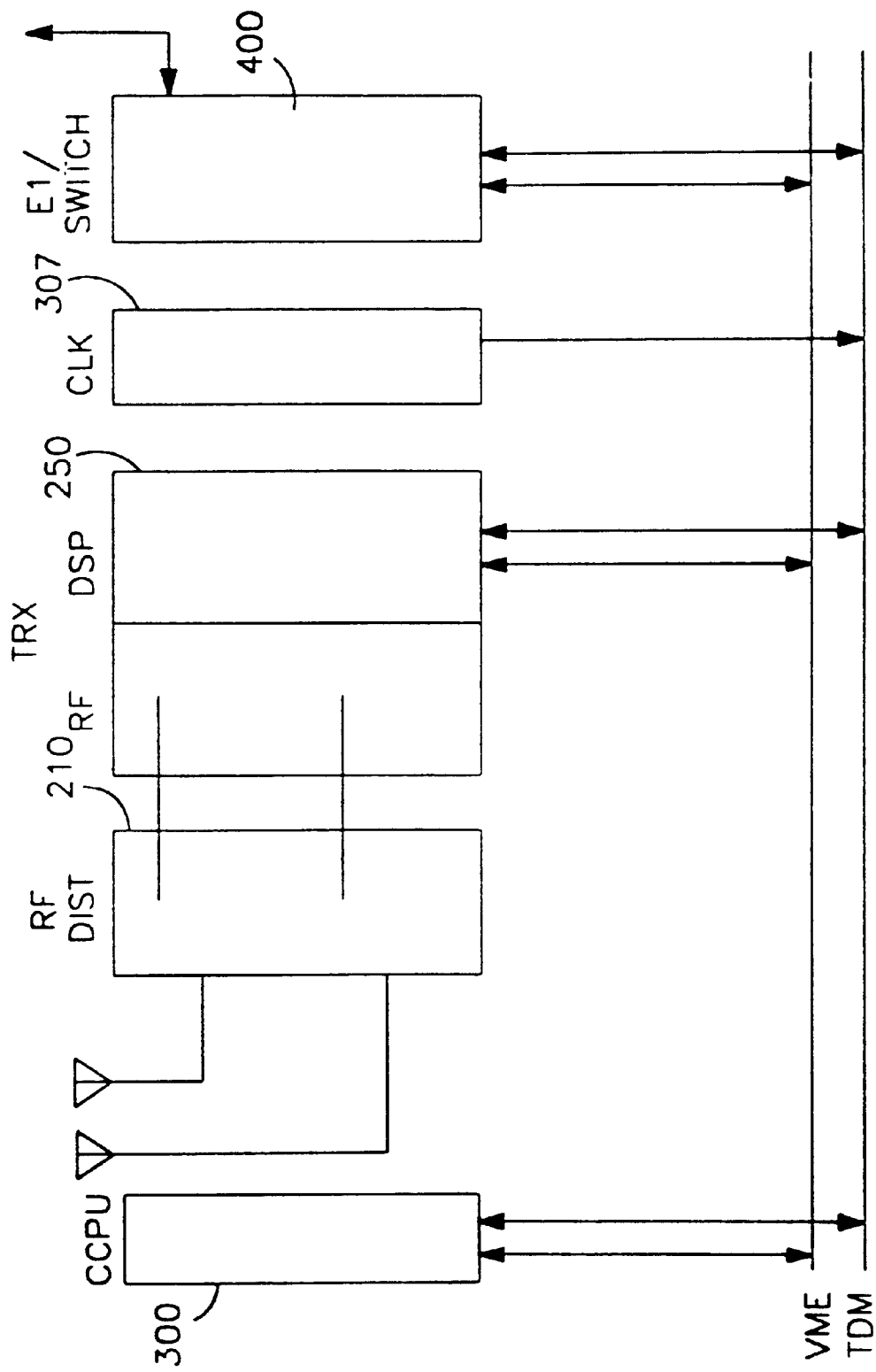
FIG. 10 depicts a base transceiver station according to another embodiment of the invention.

FIG. 10 depicts how the modular and scalable architecture of the invention is implemented with a TDM bus and a VME bus. RF distribution module 210 is coupled to TRX 250. TRX 250 is coupled to both the TDM bus and the VME bus. In particular, DSPs 256, 260 are coupled to the TDM bus and RTP 262 is coupled to the VME bus. CCPU 300 is coupled to the VME bus. A clock module 307 is coupled to the TDM bus and generates the reference clock which allows the subsystems to operate in a synchronized fashion. TM 400 is coupled to both the TDM bus and the VME bus. FIG. 10 depicts a one-TRX BTS configuration, which is also depicted in FIG. 11.

Figure 11:
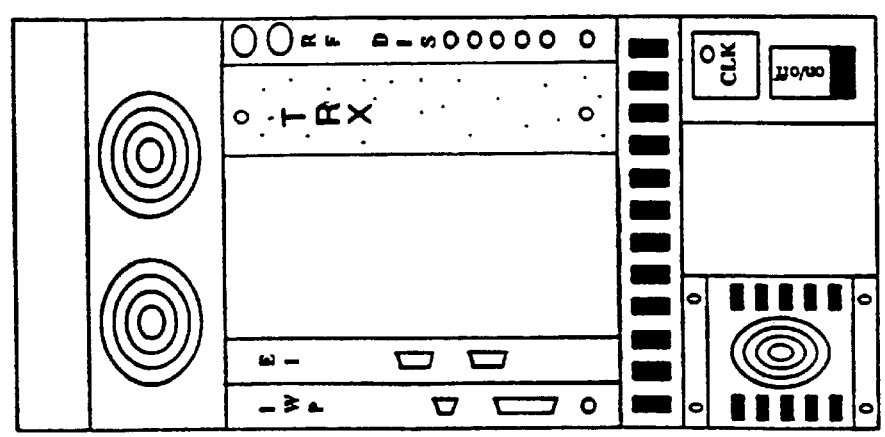
FIG. 11 depicts a base transceiver station according to another embodiment of the invention.

FIG. 11 depicts a commercial product that encloses the various base station components into a chassis. The chassis can operate as a stand alone unit, or can be mounted to an equipment rack for deployment in the field. Moreover, any card can be placed in any slot. It is possible, by removing all TRXs, to build BSC or MSC configurations using just TM and CCPU cards.

Figure 12:
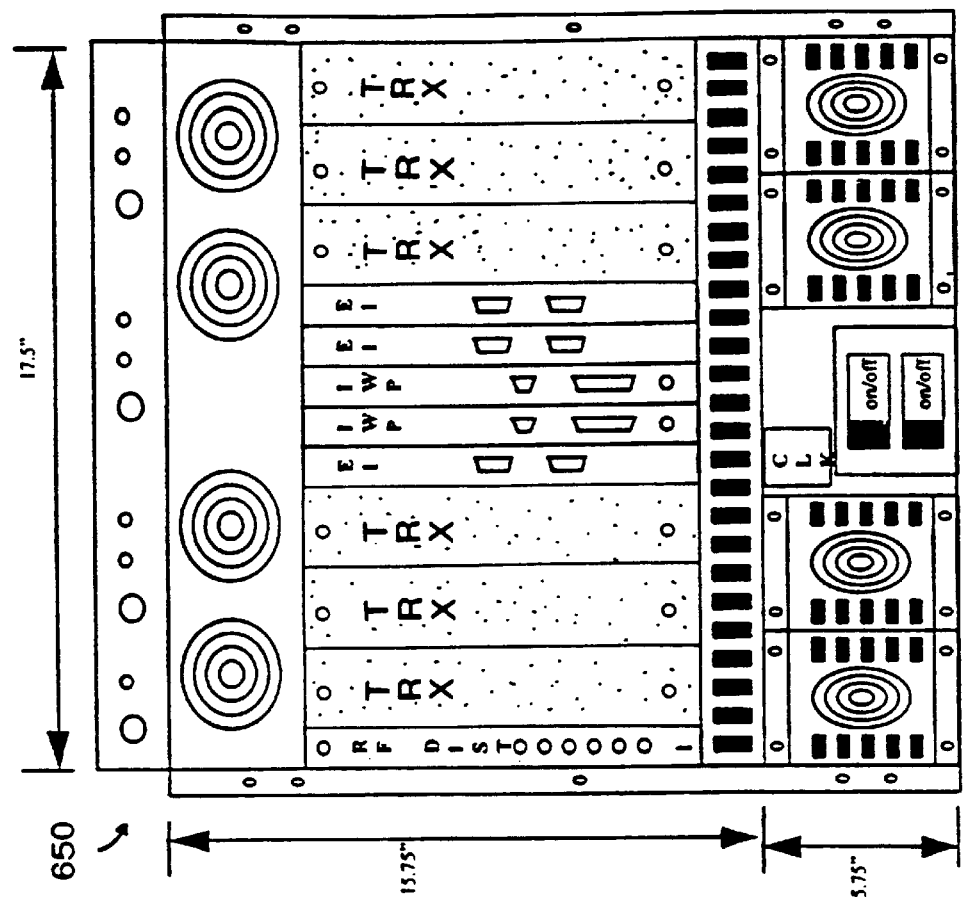
FIG. 12 depicts a base transceiver station according to another embodiment of the invention.

Since the architecture is fully scalable, FIG. 12 depicts a base station having 6 TRXs, 2 CCPUs, and 3 TMs. Any base station configuration and function can be accommodated by selecting processing elements for deployment. For example, FIG. 13 shows various possible functions, such as BTS, BSC, combined BTS/BSC, MSC, combined BSC/MSC, and combined BTS/BSC/MSC, that can be achieved with the invention. A configuration having a single TRX and single TM is possible when the CCPU functions are incorporated in the TRX RTP 262 and TM processor 404.

FIGS. 14A–D show the various functional division of inbound information processing and outbound information processing for a combined BTS/BSC and MSC. Those steps common to FIGS. 2A–D have common numbers. Once the inbound information is de-interleaved (step 110), it is sent to time/space switch 402 (step 111). The time/space switch 402 can then route the inbound information to one of three places: to the TRAU (step 116), to an E1 (step 118), or back to the TDM bus as outbound information (goto FIG. 14C step 163). If the switch step 111 routes the information to the E1 (step 118), the inbound information is sent to the MSC. Step 120 receives the information at the MSC and switch step 122 can then route the inbound information to one of four places: to the TRAU (step 123), to an echo canceler (step 124), to an E1 (step 126), or back to the BTS/BSC as outbound information (goto FIG. 14C step 152).

Figure 14A:
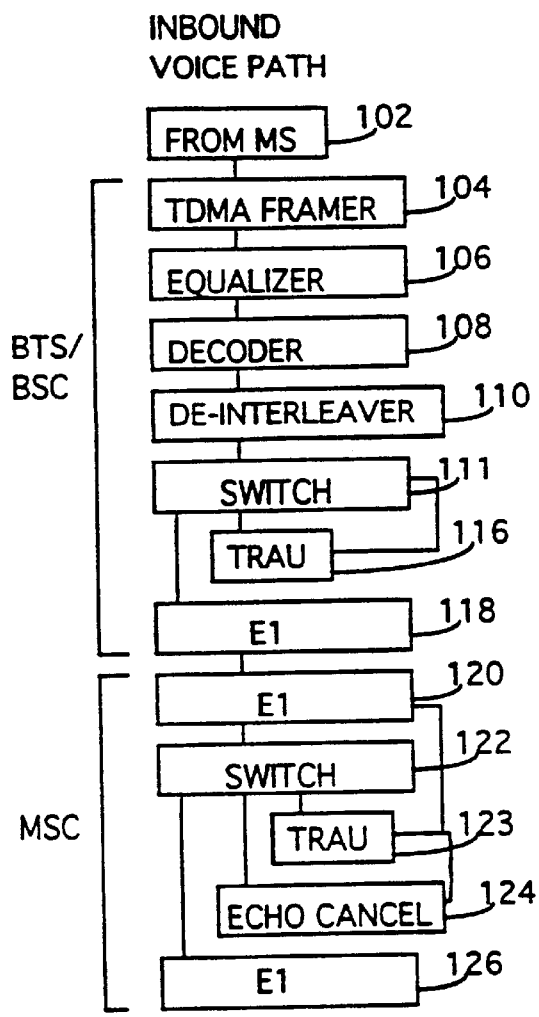
FIGS. 14A–D are flow charts showing steps performed to process inbound information and outbound information.
Figure 14B:
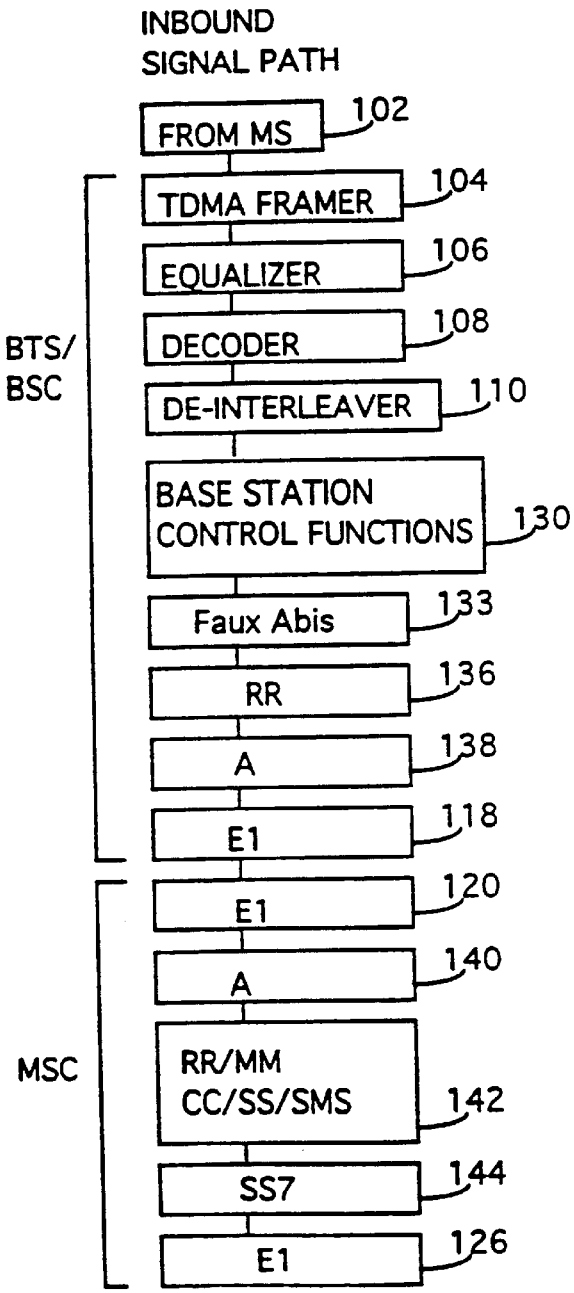
Figure 14C:
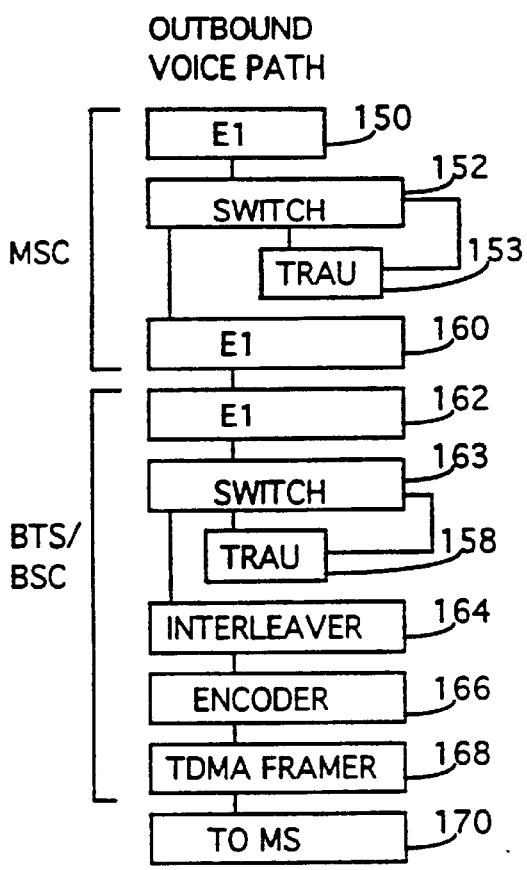

The FIG. 14B flowchart shows the inbound control signal processing. Note the Faux Abis step 133. This step is performed to retain the interface between steps 130 and 136 where the information transport steps 112, 114 over an exemplary E1 trunk are removed.

With regard to outbound information, step 150 receives information from a foreign network via an E1. The MSC in this case only receives the information from the foreign network is the destination MS is communicating with a TRX under its control. A switch step 152 can then route the information to a TRAU (step 153) or to an E1 (step 160). The BTS/BSC receives the information on an E1 (step 162) and a switch step 163 can then route the information to a TRAU (step 158) or to a TRX that interleaves (step 164), encodes (step 166), and frames (step 168) the information and sends it to the destination MS via step 170. Note that both switch steps 152 and 163 can be initiated from FIG. 14A steps 122 and 111 respectively.

Figure 14D:
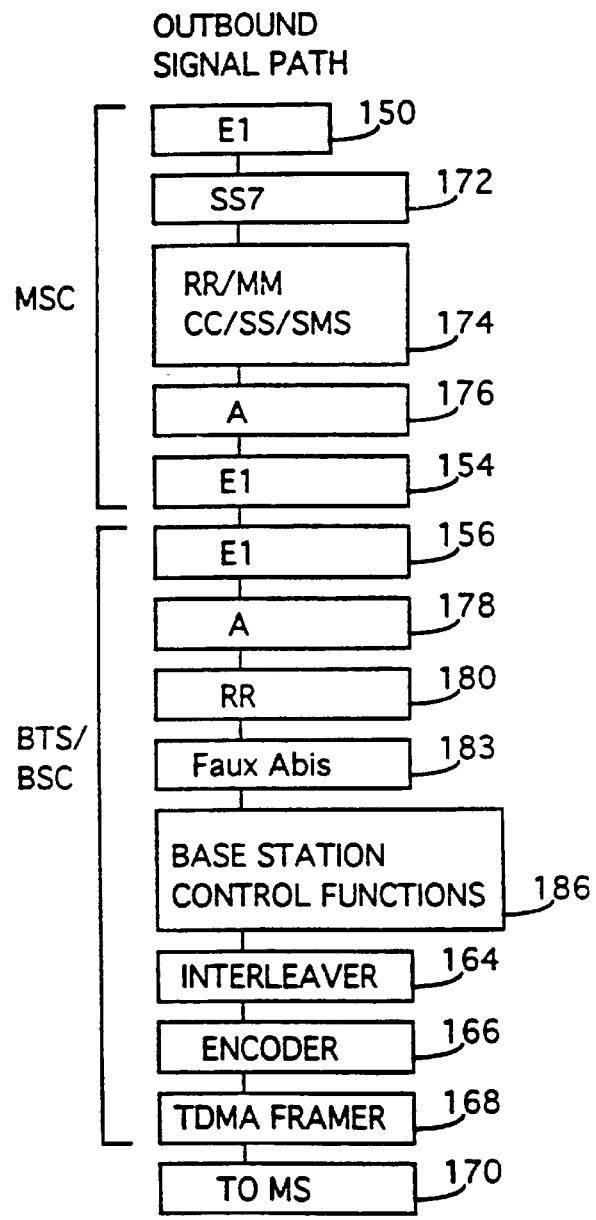

The FIG. 14D flowchart shows the inbound control signal processing. Note the Faux Abis step 183. This step is performed to retain the interface between steps 180 and 186 where the information transport steps 160, 162 over an exemplary E1 trunk are removed.

FIGS. 15A–D show the various functional division of inbound information processing and outbound information processing for a combined BTS/BSC/MSC. Those steps common to FIGS. 2A–D have common numbers. Once the inbound information is de-interleaved (step 110), it is sent to time/space switch 402 (step 111). The time/space switch 402 can then route the inbound information to one of four places: to a TRAU (step 116), to an echo canceler (step 124), to an E1 (step 126), or back to the TDM bus as outbound information (goto FIG. 14C step 152). If the switch step 111 routes the information to the E1 (step 126), the inbound information is sent to a foreign network.

Figure 15A:
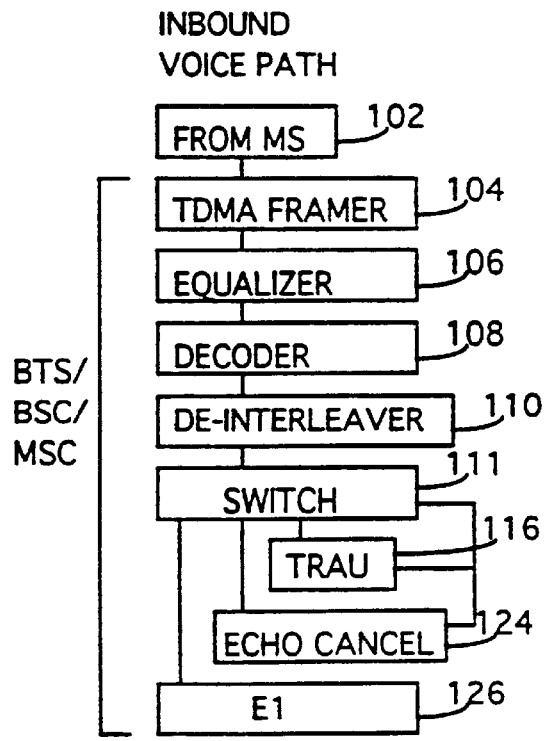
FIGS. 15A–D are flow charts showing steps performed to process inbound information and outbound information.
Figure 15B:
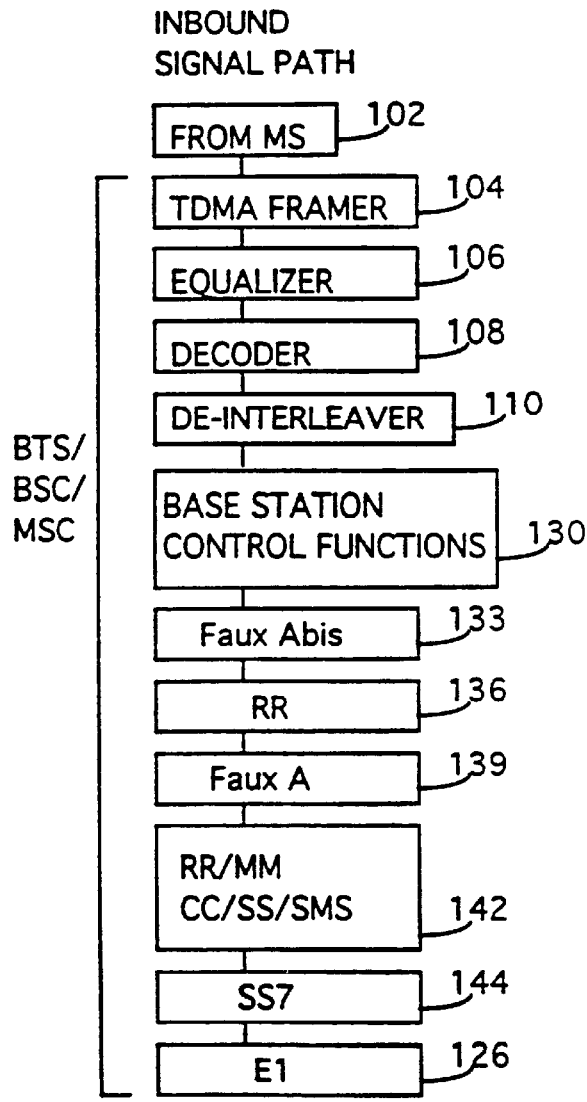
Figure 15C:
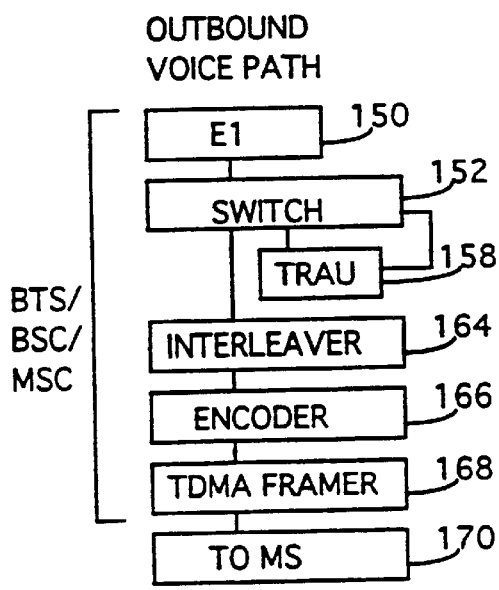

The FIG. 15B flowchart shows the inbound control signal processing. Note the Faux A step 139. This step is performed to retain the interface between steps 136 and 142 where the information transport steps 118, 120 over an exemplary E1 trunk are removed.

With regard to outbound information, step 150 receives information from a foreign network via an E1. The BTS/BSC/MSC in this case only receives the information from the foreign network is the destination MS is communicating with a TRX under its control. A switch step 152 can then route the information to a TRAU (step 158) or to a TRX that interleaves (step 164), encodes (step 166), and frames (step 168) the information and sends it to the destination MS via step 170. Note that switch step 152 can be initiated from FIG. 15A step 111.

Figure 15D:
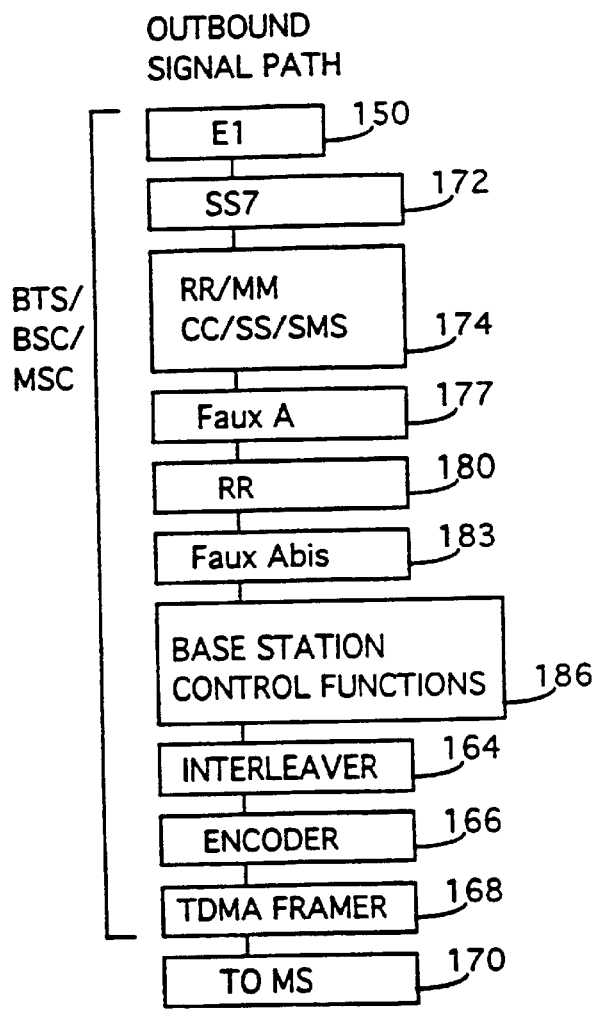

The FIG. 15D flowchart shows the inbound control signal processing. Note the Faux A step 177. This step is performed to retain the interface between steps 174 and 180 where the information transport steps 154, 156 over an exemplary E1 trunk are removed.

An important feature of the scalable architecture is that when TM cards are added, the switching ability of the base station increases. For example, by configuring a base station with 3 TM modules, as shown in FIG. 12, the base station capacity is increased to 6 E1 output ports. This configuration provides both greater communication capacity to a MSC, as well as greater information switch capacity within the base station itself, such as between TRX cards.

Advantages of the present invention include modularity, scalability, distributed processing, improved performance, reduced network congestion, fault tolerance, and more efficient and cost-effective base stations.

As used herein, when a first element and a second element are coupled, they are related to one another, but need not have a direct path to one another. For example, an antenna element may be coupled to a processing element via a receiver. However, when a first element and second element are connected, they are required to have a direct path to one another.

ALTERNATIVE EMBODIMENTS

Having disclosed exemplary embodiments and the best mode, modifications and variations may be made to the disclosed embodiments while remaining within the scope of the present invention as defined by the following claims.

What is claimed is:

1. A base station for communicating with a mobile station via a radio link, the base station comprising:
   a plurality of transceivers configured to receive inbound information from the mobile station and transmit outbound information to the mobile station, each transceiver comprising:
      a signal processor coupled to a data bus, the signal processor configured to equalize and decode the inbound information and to transmit the inbound information to the data bus, and configures to receive the outbound information from the data bus and encode the outbound information; and
      a transceiver processor coupled to the signal processor and a control bus, the transceiver processor configured to control the signal processor; and
   a trunk module having an interface processor coupled to the data bus and the control bus and configured to receive the inbound information from the data bus and transmit the inbound information to a foreign network, and configured to receive the outbound information from a foreign network and transmit the outbound information to the data bus.

2. The base station of claim 1, further comprising a central processor coupled to the control bus and configured to control the transceiver processor and the trunk module.

3. The base station of claim 2, wherein:
   the trunk module further includes a time/space switch coupled to the data bus, a plurality of signal processors coupled to the time/space switch, and an interface framer coupled to the time/space switch.

4. The base station of claim 3, wherein the plurality of signal processors in the trunk module coupled to the time/space switch are adapted to perform transcoder rate adaptation, echo cancelling or other internetwork functions.

5. The base station of claim 1, wherein at least one of the plurality of transceivers includes a string of a plurality of signal processors coupled to a data bus, the string of signal processors configured to equalize and decode the inbound information and to transmit the inbound information to the data bus, and configured to receive the outbound information from the data bus and encode the outbound information.

* * * * *